(No Model.) 7 Sheets—Sheet 1.

F. D. BELKNAP.
ADDRESSING MACHINE.

No. 477,793. Patented June 28, 1892.

Witnesses
W. H. Courtland
Richard H. Mitchell

Frank D. Belknap
Inventor,
by A. P. Smith
Atty (No Model.)   7 Sheets—Sheet 3.

F. D. BELKNAP.
ADDRESSING MACHINE.

No. 477,793. Patented June 28, 1892.

Witnesses
W. H. Courtland
Richard H. Mitchell

Frank D. Belknap
Inventor
by A. P. Smith
Atty.

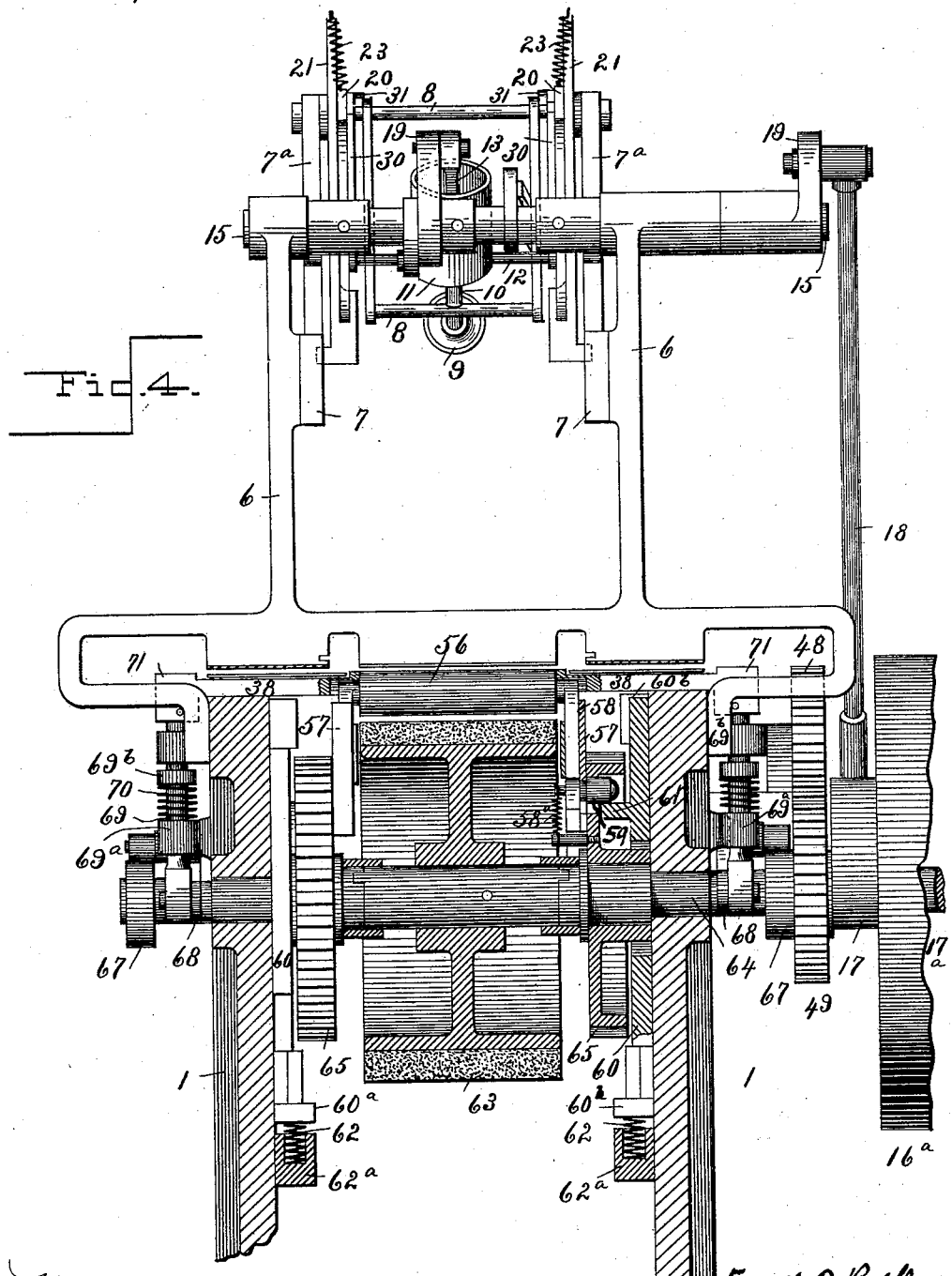

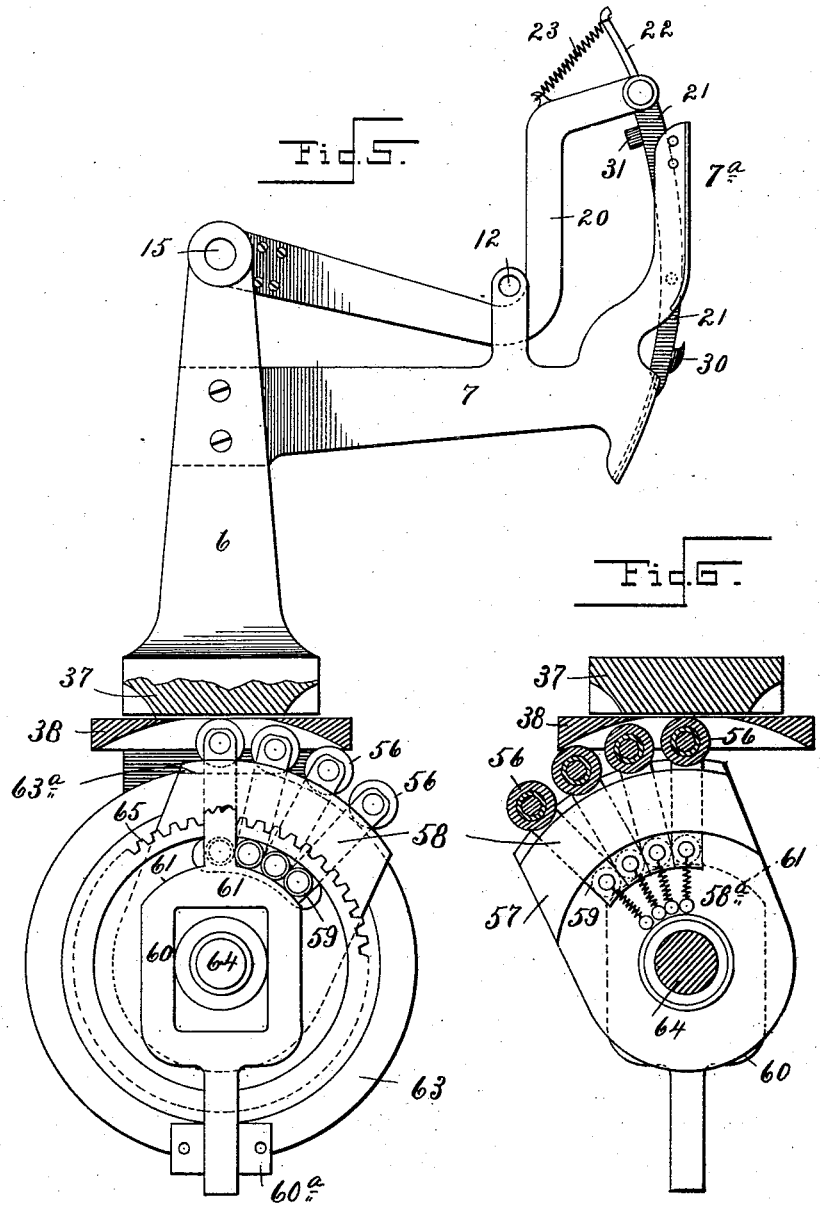

(No Model.) 7 Sheets—Sheet 6.
F. D. BELKNAP.
ADDRESSING MACHINE.
No. 477,793. Patented June 28, 1892.
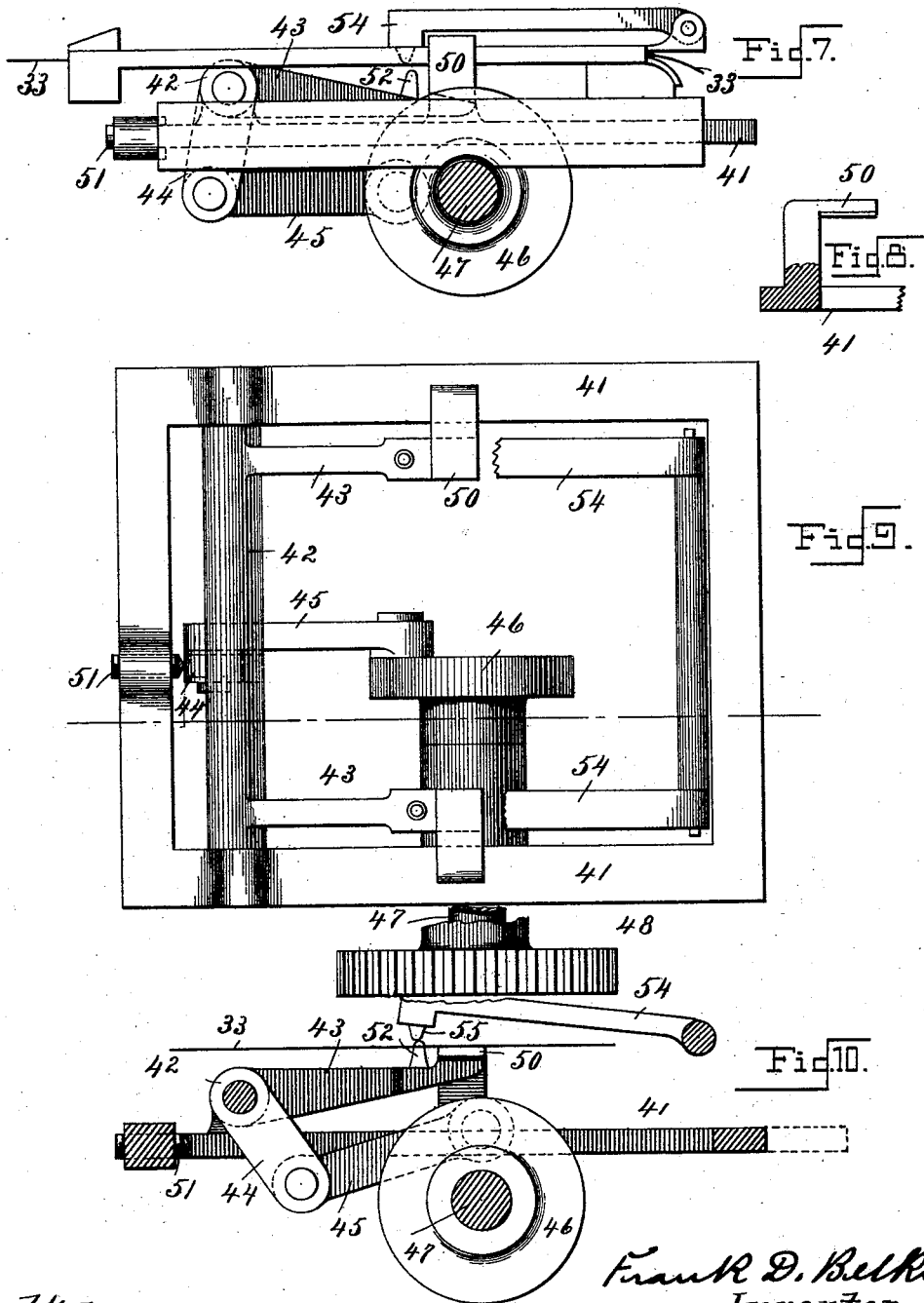
Witnesses
W. H. Courtland
Richard T. Mitchell
Frank D. Belknap
Inventor, by
A. P. Smith
Atty.

(No Model.)
F. D. BELKNAP.
ADDRESSING MACHINE.
No. 477,793.
7 Sheets—Sheet 7.
Patented June 28, 1892.
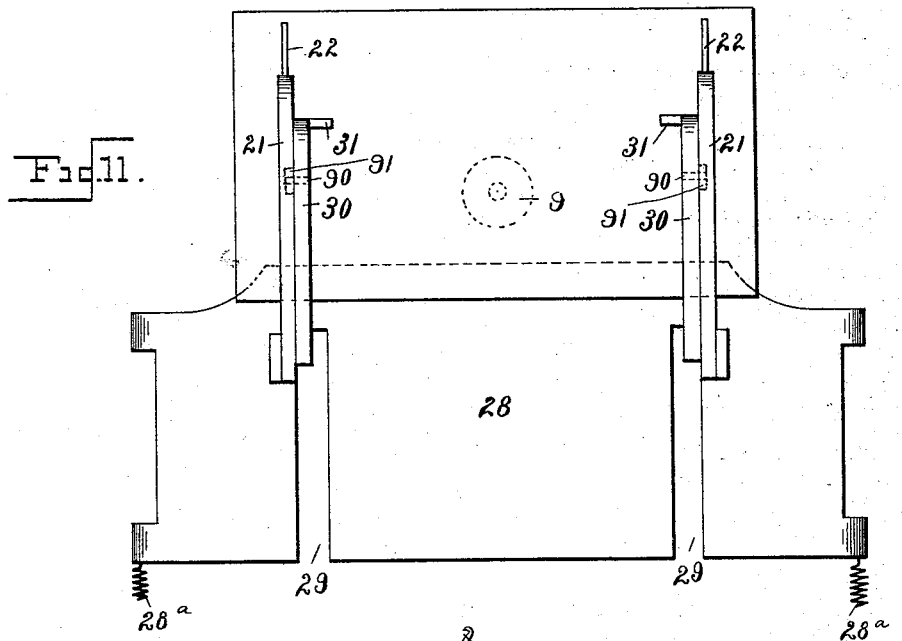
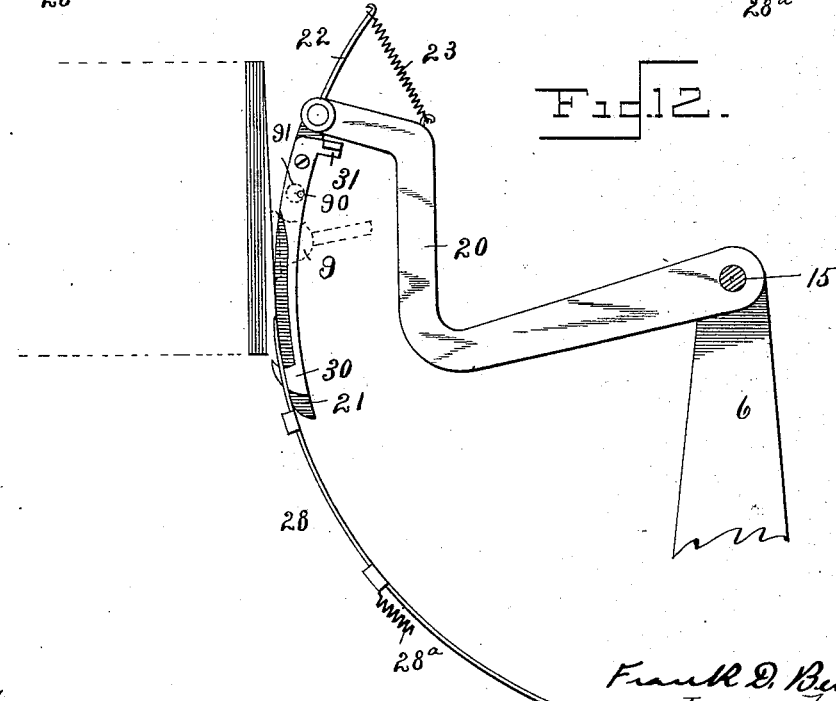
Witnesses
W. H. Courtland
Richard H. Mitchell
Frank D. Belknap
Inventor, by
A. P. Smith
Atty.

UNITED STATES PATENT OFFICE.

FRANK D. BELKNAP, OF NEW YORK, N. Y.

ADDRESSING-MACHINE.

SPECIFICATION forming part of Letters Patent No. 477,793, dated June 28, 1892.

Application filed August 15, 1891. Serial No. 402,704. (No model.)

*To all whom it may concern:*

Be it known that I, FRANK D. BELKNAP, a citizen of the United States, residing at New York, in the county of New York and State of New York, have invented certain new and useful Improvements in Addressing-Machines; and I do hereby declare the following to be a full, clear, and exact description of the invention, such as will enable others skilled in the art to which it appertains to make and use the same.

My invention relates to that class of mechanism by which each one of a list of names or addresses may be printed successively upon a series of envelopes or wrappers, and thus many thousands of letters, circulars, or papers may be addressed to persons all over the country rapidly and accurately.

Figure 1:
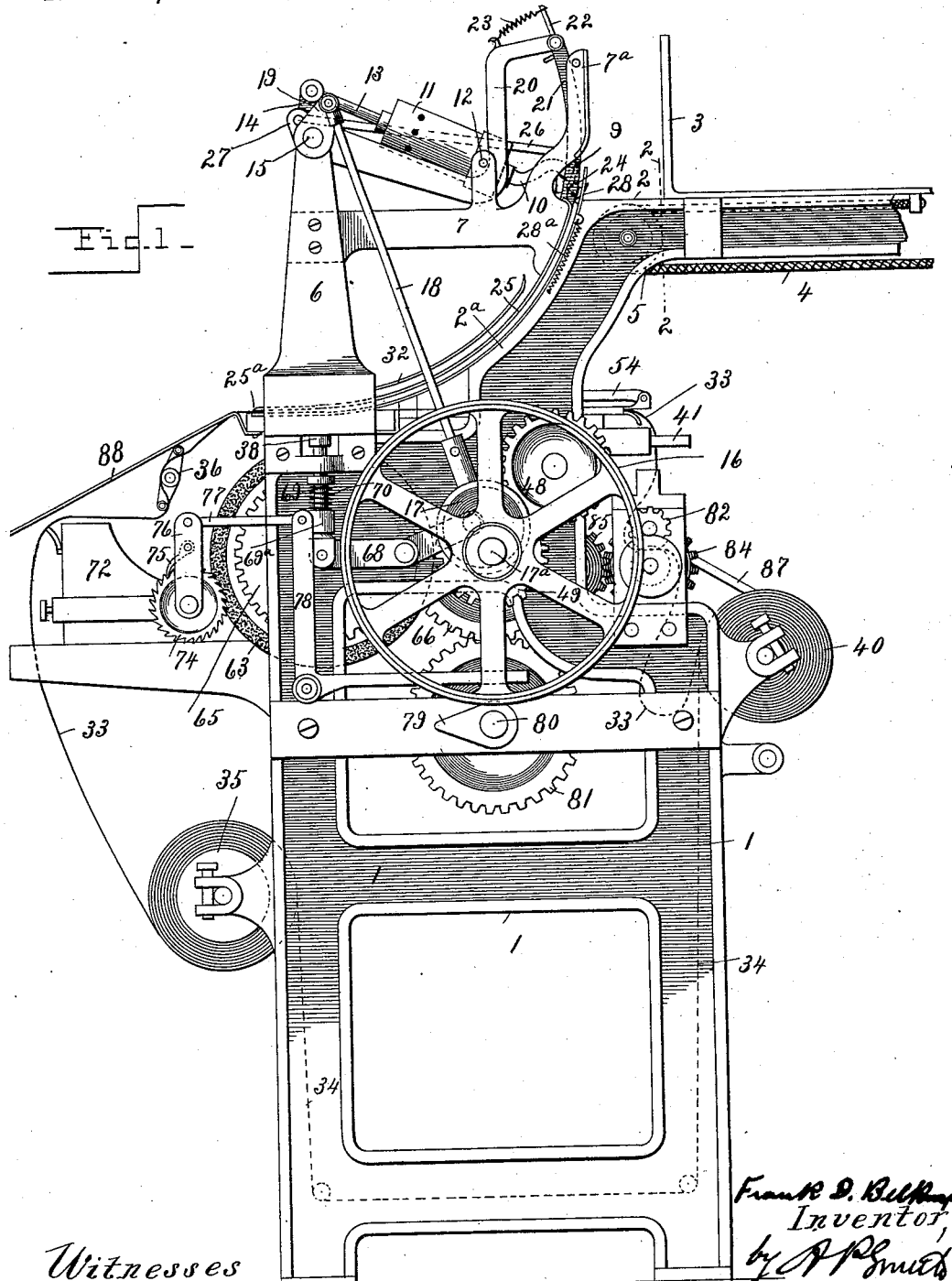
Figure 2:
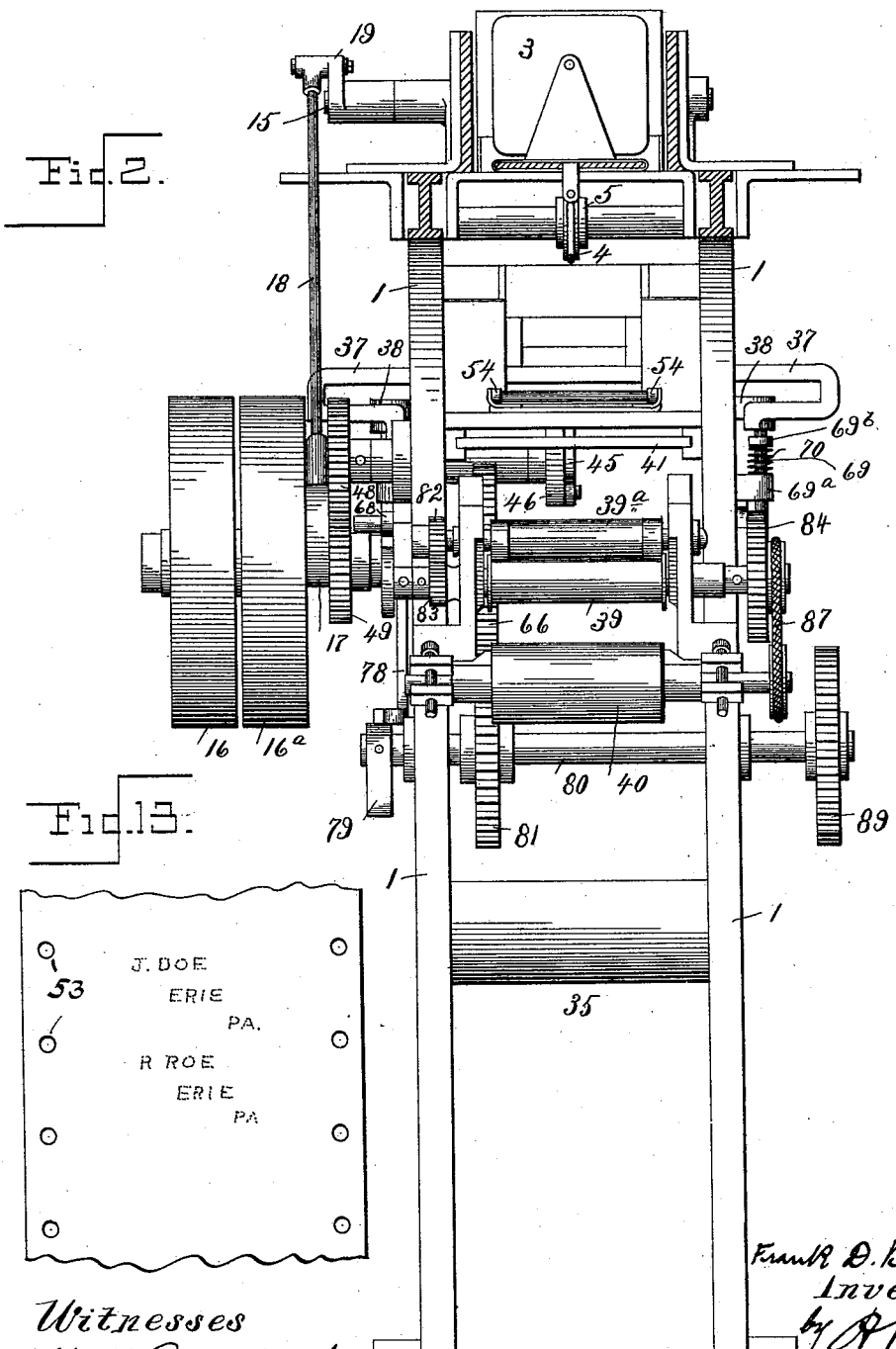
Figure 3:
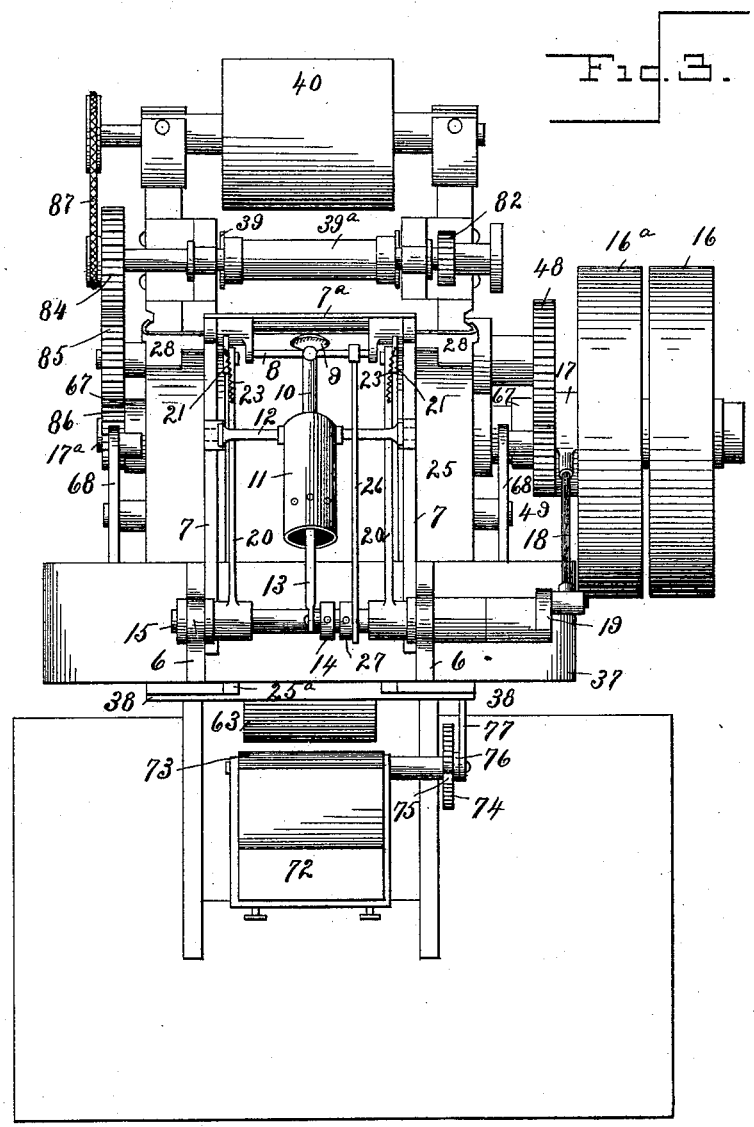

In the drawings, Figure 1 is a side view of my machine, a part of the table and feeding-slide being broken off. Fig. 2 is a rear view and partial section on line 2 2 of Fig. 1. Fig. 3 is a plan view with the feed-table removed. Fig. 4 is a vertical central section through the stenciling apparatus. Fig. 5 is a detail view of the vibrating carrier and exterior view of the inking rolls and drum. Fig. 6 is a section of the inking-rolls and internal view of their carrying-frame. Figs. 7, 8, 9, and 10 are details of the stencil-feed. Fig. 11 is a front view. Fig. 12 is a side view of the separating-plate and the vibrating carrier. Fig. 13 shows the stencil.

Heretofore it has been customary in using addressing-machines employing a continuous stencil of parchment or paper of the kind upon which this invention is an improvement to cause said stencil to run between an inking-roll and a drum to which the envelopes or wrappers to be addressed were fed. This has required the services of a skilled attendant to run and feed the machine, and even then the stencil and the feeding-drum would slightly vary their rates of speed, so that the addresses would get out of center. Only every other address on the stencil-ribbon could be used, for the reason that the envelopes must travel at the exact speed of the stencil, and if the envelopes are four inches broad only addresses four inches apart can be used, and consequently as it would be a waste of stencil material to set the addresses four inches apart they are set closer together and the intermediate ones skipped, so that each ribbon had to be run through twice and an unnecessarily large amount of ink was used and left upon the stencil-ribbon to gum it up. To avoid these difficulties and obtain a machine which shall do its work automatically without requiring the operator to do more than to put a mass of envelopes in the feeding-slide to insure a positive stencil-feed, the exact centering of each address, and the printing of every name at one passage of the stencil through the machine, even though the names are close together, I have invented the apparatus illustrated in the accompanying drawings, in which—

1 is the main frame of the machine.

2 is the feed-table, having the curved runway 2$^a$ and the feeding-slide 3. This feeding-slide 3 is controlled by the cord or chain 4, running over a pulley 5 to a weight or spring. (Not shown.) Of course any other arrangement of spring or weight to force the feeding-slide forward might be used.

6 6 are upright standards, and 7 7 horizontal arms extending therefrom, on which the carrier mechanism is supported. From the upwardly-extending ears 7$^a$ of these arms the oscillating frame 8 is swung. This frame supports the rubber-mouthed suction-holder 9, which is connected by the flexible tube 10 with the air-pump 11. This pump 11 is mounted on the shaft 12, and is operated by the piston-rod 13, connected to the crank 14 on the shaft 15.

16 is the loose pulley, and 16$^a$ the driving-pulley, over which the driving-belt is to run.

17 is an eccentric on the main shaft 17$^a$, on which said driving-pulley is mounted.

18 is the eccentric-rod, which communicates motion to the crank 19 on the shaft 15. The arms 20 20 of the vibrating carrier are bent, as shown in Figs. 1, 5, and 12, to enable them to get under the shaft 12, on which the air-pump is mounted. These arms 20 20 are rigidly fixed to the shaft 15, and by virtue of the connections above described are caused to vibrate with every revolution of the main driving-shaft 17$^a$, so that the vibrating carrier travels back and forth along the curved runway $2^a$, whose arc of curvature has the shaft 15 for its center.

The vibrating carrier consists of the arms 20 20, having the spring-fingers 21 21 pivoted thereon. The lower ends of fingers 21 are tipped with rubber or some adhesive compound, and are normally forced down upon the runway $2^a$ by the tension of the spiral springs 23, attached to the upper ends 22 of the said fingers. The fingers have lugs 24 on their outer faces, which slide under and over the curved strips 25. They go under on the downstroke, and are thereby caused to grip the envelope beneath them firmly. When they have reached the lower end $25^a$ of the strips, the lugs snap up over them and ride on the upper side thereof on the upstroke, thereby releasing the envelope and leaving it at the lowest point of the travel of the carrier. In this way the upper side of strip 25 may be said to serve as a cam-track for the return of finger 21.

The suction-holder 9 is a bell-shaped piece with rubber lips, which when pressed against the column of envelopes, as shown in Fig. 12, picks the first one up by virtue of the suction created by the pump 11. The oscillating frame 8, on which the suction-holder is mounted, is controlled by the link 26, extending to the crank 27 on the shaft 15. This acts to withdraw the holder and lift the envelope out into the position shown in Fig. 12. The separating-plate 28 is then lifted in back of it, and the spring-fingers 21 seize it and carry it down. The plate 28 has slots 29, up into which the hooks 30 slide, lifting the plate a short distance during the last part of the upward stroke of the vibrating carrier. These hooks 30 are pivoted to the sides of the fingers 21, and are therefore mounted and oscillated on said fingers. The springs $28^a$ draw said plate down again. The hooks have lugs 31 on their upper ends above their pivoted points of support which engage with the under face of the cam-strips 32 during the lower half of the stroke of the carrier, and thereby the upper ends of said piece 30 are depressed and their lower and hooked ends are lifted up, so that they do not bring up the envelope on the upstroke of the carrier, but leave it in the grasp of the printing apparatus. The vibrations of the hooks 30 are limited by the pin 90, working in the recess 91 in said hooks.

The main elements of the printing apparatus are the ribbon or continuous stencil in which the names and addresses to be used are perforated and the inking mechanism. The stencil 33, together with the keeper-ribbon 34, is unrolled from the spool 35. The stencil-ribbon runs through the tension device 36, under the stationary platen 37, and over the reciprocating skeleton platen 38. It then goes through the stencil-feed and between the cleaning or wiping rollers 39 $39^a$ to the winding-up spool 40. The keeper-ribbon 34 passes under the machine direct from the spool 35 to spool 40. This keeper is always wound up with the stencil to keep the ink from getting on the wrong side of the stencil and smudging the envelopes.

The stencil-feed mechanism is illustrated in Figs. 7 to 10. The slide 41 has the bell-crank 42 mounted thereon. The lower arm 44 of this bell-crank is connected by link 45 to crank-disk 46 on shaft 47. Shaft 47 is driven by gear 48, which meshes with gear 49 on the main shaft. The upper arm 43 of the bell-crank has its motion limited by the stops 50. The arm 44 has its motion limited by the adjustable stop 51. The arms 43 have projections 52, which register with the perforations 53 in the borders of the stencil-ribbon. The tumbler 54, mounted on a bracket on the main frame, has downward projections 55, which also register with these perforations. When these are allowed to drop into the perforations during the left-handed motion of the slide, the stencil is stopped and held in the proper position to print a name and address, as shown in Fig. 7. At the beginning of the right-hand stroke of the slide the bell-crank is lifted, as shown in Fig. 10. The projections 52 then enter the perforations 53 in the stencil-ribbon, forcing out the tumbler and moving the ribbon forward till the next name is centered and the tumbler has fallen into the next pair of holes or perforations 53. The feed-slide returns with its bell-crank in the position shown in Fig. 7.

The printing mechanism is illustrated in Figs. 4, 5, and 6. The inking-rollers 56 are mounted in slides 58, which are capable of radial motion in the rotating crank frames or carriers 57. Upon the inner ends of these slides are mounted the little idlers 59. The cam-supporting pieces 60 are mounted in vertical guides $60^a$ and $60^b$ and rest upon springs 62, stepped in sockets $62^a$. These give a yielding support to the pieces 60, which have the cams 61 formed thereon. As the idlers 59 run over these cams the inking-rollers are lifted off the stationary inking-drum 63, which may be cut away, as at $63^a$, Fig. 5, to facilitate this freeing of the rollers from the drum. The drum may be left entirely cylindrical, however, and the same result obtained by raising the cams 61. The drum 63 is mounted on the stationary shaft 64 and does not revolve. When the idlers 59 are not on the cams, the springs 58 hold the inking-rollers down upon the inking-drum 63. The springs 62 may be dispensed with and liners or set-screws introduced in their places to give the necessary adjustment to the cam-supporting pieces 60. Motion is given to the inking mechanism by gears 65 and 66, the latter being on the main shaft.

The reciprocating skeleton platen 38 has lateral projections 71, which are supported by plungers 69, which work through lugs $69^a$ upon the main frame 1. Springs 70 surround said plungers and are confined between the lugs 69ª on the main frame and the collars 69ᵇ on the plunger. The levers 68 are connected to said plungers, and when their other ends are forced up by the cams 67 the platen 38 is lowered. The springs 70 raise it again when the cams allow them to do so.

The ink-fountain 72 has a fountain-roll 73, operated by the ratchet-wheel 74 and pawl 75 on the lever 76. This lever is oscillated by the link 77, extending from the bell-crank 78, to which motion is given by the cam 79 on the shaft 80. Motion is given to this shaft by the gear 81, meshing with the gear 66. The ink-rollers 56 touch the fountain-roll 73 and take up the ink therefrom. The pinion 86 on the main shaft drives the idle-gear 85, which drives gear 84 upon wiping-roll 39 of the pair 39 39ª. This pair of wiping-rollers are geared together by gears 82 83. The belt 87 transmits motion to the spool 40 and is left slack, so that it may slip when the increased diameter of the roll forming on said spool requires that it should run more slowly.

With the aid of the foregoing description of parts the mode of operation of the machine will easily be understood. The stencil-ribbon having been threaded through the machine and a column of envelopes placed before the feeding-slide 3, motion is given to the apparatus by shifting the belt onto the driving-pulley 16ª. The plunger of the air-pump being withdrawn on the upward stroke of the vibrating carrier, the suction-holder 9 picks up the first envelope. The suction-holder being then withdrawn by the action of the crank and link 27 26, the envelope is lifted out into the position shown in Fig. 12. The separating-plate 28 is lifted in behind the envelope by the hooks 30, and the spring-fingers 21, dropping off the end of the camway 25, come down upon the envelope, which is thus gripped between the fingers and the plate. The downward stroke of the carrier allows the plate 28 to fall back to its position, thrusts the suction-holder 9 out for a second envelope, and carries the first one down the curved runway under the stationary platen 37. At that moment the cam 67 has acted to draw down the reciprocating skeleton platen 38, so as to permit the envelope to be placed between the two platens. The lugs 24 on the spring-fingers 21 snap up over the ends 25 of the cam-strips 25 and ride back on top of the same. The hooks 30 are lifted out of the way by virtue of the lugs 31, running under the cam-strips 32, so that the vibrating carrier makes it oke without withdrawing the envelope from the grasp of the printing apparatus. By virtue of the action of the springs 70 the reciprocating platen 38 is lifted up again as soon as the vibrating carrier has begun its up trip and the envelope is securely held between the two platens. The stencil-ribbon has been fed along while the platens are apart and a new address centered under each envelope by the feed illustrated in Figs. 7 to 10, and is gradually wound off of the spool 35 and onto that 40 by this feed. The slack is prevented from accumulating in the machine by the action of the cleaning and wiping rolls 39 39ª. These rolls are made of such composition that they act as cleaners by reason of the fact that ink will adhere to them and leave the stencil-ribbon. As the stencil-ribbon runs over the reciprocating platen 37 it is forced up against the the envelope by it. The inking-rollers 56 having picked up a supply of ink in their revolution are lifted up by the cam 61 and rolling along the under side of the stencil print the name and address cut therein upon the envelope above it. The roller 73 is given a partial revolution at every turn of the cam 79, so as to present a fresh inky surface to the inking-rollers as they come around.

After the envelope has been printed it is released by the downward motion of the reciprocating platen caused by the cams 67, and the vibrating carrier coming down with a second envelope kicks the first one out onto the table 88. Connections may be made to the gear 89 to operate additional mechanism.

It is evident that various changes might be made in the details of the mechanism without departing from the spirit of my invention. Crank-motions may be substituted for eccentrics, weights for springs, and vice versa. The ink fountain and rolls may be operated by other methods well known in the art. The driving-pulley may be put on any other shaft, &c.

Having therefore described my invention, what I claim as new, and desire to protect by Letters Patent, is—

1. In an addressing-machine, the combination of the table, the horizontal feeding-slide, the vibrating carrier which runs along a curved runway the upper portion of which is at right angles to the line of motion of the feeding-slide, and the suction-holder, substantially as described.

2. In an addressing-machine, the combination of the table, the feeding-slide, the vibrating carrier, the suction-holder, and the air-pump connected to said suction-holder and operated in unison with the movements of the vibrating slide, substantially as described.

3. In an addressing-machine, the combination of the table, the feeding-slide, the vibrating carrier, the suction-holder, the oscillating frame on which said suction-holder is mounted, the shaft which operates said vibrating carrier, and connecting mechanism whereby said shaft causes said oscillating frame to move backward or forward at the proper moment, substantially as described.

4. In an addressing-machine, the combination of the table with a curved runway, the vibrating carrier traveling along said runway, the feeding-slide at one end of said runway, and the printing device at the other end, substantially as described.

5. In an addressing-machine, the combination of the table with a curved runway, the vibrating carrier traveling along said runway, having the spring-fingers mounted thereon, the feeding-slide at one end of said runway, and the printing device at the other end, substantially as described.

6. In an addressing-machine, the combination of the table with a curved runway, the vibrating carrier traveling along said runway and having the spring-fingers mounted thereon, the feeding-slide, the separating-plate, and the suction-holder, substantially as described.

7. In an addressing-machine, the combination of the table with a curved runway, the vibrating carrier traveling along said runway and having the spring-fingers mounted thereon, the feeding-slide, the separating-plate, the hooks on the carrier for lifting said plate, the suction-holder, and the return cam-track for the spring-fingers, substantially as described.

8. In an addressing-machine, the combination of the table, the vibrating carrier having the spring-fingers mounted thereon, the return cam-track for said fingers, the sliding separating-plate, the hooks on the carrier, which operate said plate, and the cams which lift said hooks out of the way of the envelope, substantially as described.

9. In an addressing-machine, the combination of the stationary platen, a vibrating carrier which places the envelope below said platen, the stencil, a cam mechanism by which said stencil may be pressed against the envelope under the platen, and an inking apparatus which rolls over said stencil while in this position, substantially as described.

10. In an addressing-machine, the combination of a stationary platen, a stencil beneath said platen, a stationary inking-drum, one or more inking-rollers which revolve around said drum, a cam by which said rollers are lifted off the drum and forced against the stencil, the ink fountain and roll, and the driving-gears, substantially as described.

11. In an addressing-machine, the combination of a stationary platen, a stencil beneath said platen, a stationary inking-drum flattened at that portion of its circumference opposite the stencil, one or more inking-rollers which revolve around said drum, a yielding cam-track which lifts said rollers off said drum when opposite said platen, the ink-fountain, and driving-gears, substantially as described.

12. In an addressing-machine, the combination of a stationary platen, a movable skeleton platen opposite thereto, a continuous stencil which runs between, and a set of inking-rolls, and mechanism which causes said inking-rolls to come up under the skeleton platen and press ink through the same and through the stencil, substantially as described.

13. In an addressing-machine, the combination of a continuous stencil which has regularly-spaced perforations therein, a tumbler which is pivoted to the main frame and which has projections that fall into said perforations, a reciprocating stencil-feed on the other side of the stencil, pins connected therewith, which register with the above-mentioned perforations, and mechanism for raising and lowering said pins, substantially as described.

14. In an addressing-machine, the combination of the continuous stencil which has regularly-spaced perforations therein, the stencil-feed slide, the bell-crank mounted thereon, the link by which the lower arm of said bell-crank is connected to the driving-gear, the projections on the upper arms of said bell-crank, which enter the perforations in the stencil, and the stops by which the play of said bell-crank is limited, substantially as described.

In testimony whereof I affix my signature in presence of two witnesses.

FRANK D. BELKNAP.

Witnesses:
  A. P. SMITH,
  PETER R. GATENS.